April 14, 1959 — E. F. CORDELL — 2,882,363
LOW PRESSURE TIRE INDICATOR
Filed Sept. 8, 1955 — 2 Sheets-Sheet 2

E. F. CORDELL
INVENTOR.
BY Loyal J. Miller
ATTORNEY

United States Patent Office 2,882,363
Patented Apr. 14, 1959

2,882,363

LOW PRESSURE TIRE INDICATOR

E. F. Cordell, Lubbock, Tex.

Application September 8, 1955, Serial No. 533,118

2 Claims. (Cl. 200—61.26)

The present invention relates to the trucking industry, and more particularly to a pneumatic tire pressure indicating switch.

In the trucking or transporting industry where large and heavy loads are carried, it is desirable for the driver to receive a warning that one or more of the tires is losing or has lost its pressure. Most large transport trucks use dual wheels and tires in order to comply with the various States' highway regulations and to properly support the load. One of the tires of the dual wheels may lose its pressure, thus placing an undue load on the remaining tire and, in many instances, ruining one or both tires before the driver is aware of the flat tire.

The prior art reveals pressure indicating switches which feature pressurized fluid reservoirs or diaphragms actuated by the tire pressure. The primary objection to these devices lies in the necessity of maintaining the fluid reservoirs leak proof and in replacing the diaphragms when the same become ruptured.

The primary object of the present invention is to provide a low pressure indicating switch for each individual tire.

An additional object is to provide a low pressure indicating switch which illuminates a signal lamp visible to the driver when the pressure in any one of the tires is relieved.

A further object of this invention is to provide a signaling means to warn the driver of a vehicle that the pressure is low in a tire, thus possibly preventing an accident.

A still further object of this invention is to provide a low pressure indicating switch which is comparatively easily installed on a vehicle tire rim and thereafter remains in position and needs no further servicing or care.

An additional object is to provide a device of this class which is reliable and positive in its operation.

Another object is to provide a device of this class which has its actuating spring mounted external of the movable cylinder rather than internally thereof.

The present invention accomplishes these and other objects by providing a cylindrical plug-like body having a shank end adapted to be threadedly engaged through a tire mounting rim on a vehicle. The body is centrally bored with enlarged annular recesses at each end of the bore. A spring actuated plunger or rod is slidably mounted in the bore of the body and has an annular flange or circular head on its inner end contacting the tire tube. A disk is threadedly connected to the outer end of the rod within the body. An electrical insulated screw projects laterally through the wall of the body from the enlarged recess of its outer end. Electrical wiring connects the screw to an electrically insulated ring carried by the wheel. A carbon brush carried by the vehicle in contact with the insulated ring is connected to a lamp by electrical wiring. The disk is spaced from the screw head by pressure within the tube and the rod is actuated by the spring to contact the disk with the screw head and complete the electrical circuit and light the lamp when the pressure is relieved.

Other objects will be apparent from the following description when taken in conjunction with the accompanying two sheets of drawings, wherein.

Like characters of reference designate like parts in those figures of the drawings in which they occur.

In the drawings.

Figure 1:
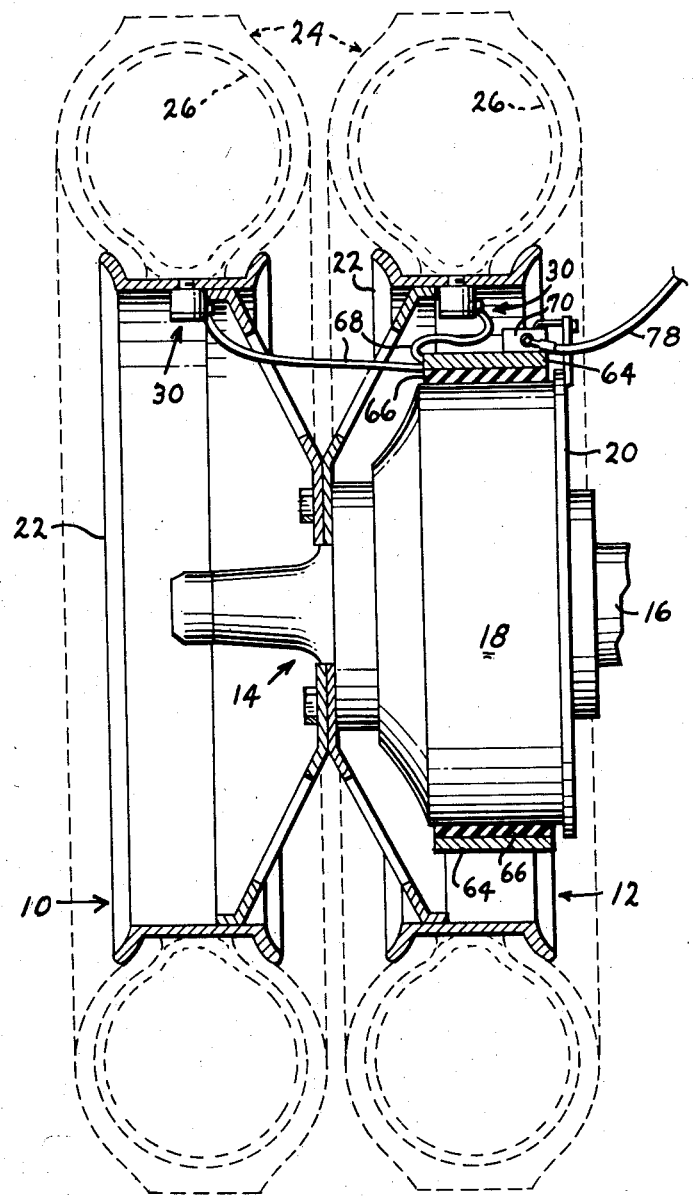
Figure 1 is a vertical cross sectional view, partly in elevation, of a vehicle dual wheel illustrating the installation of the invention thereon, the tires being shown by dotted lines.

The reference numerals 10 and 12 indicate, as a whole, a pair of wheels mounted in a conventional manner on a vehicle hub 14 carried by an axle 16. The hub 14 carries a brake drum 18. A brake disk 20 rigidly carried by the axle closes the brake drum in a conventional manner. Each wheel carries a tire rim 22, a tire 24, and a tube 26. The above description is conventional with vehicles, particularly trucks, and forms no part of the instant invention other than to show a workable combination of vehicle parts for the installation of the device.

Figure 2:
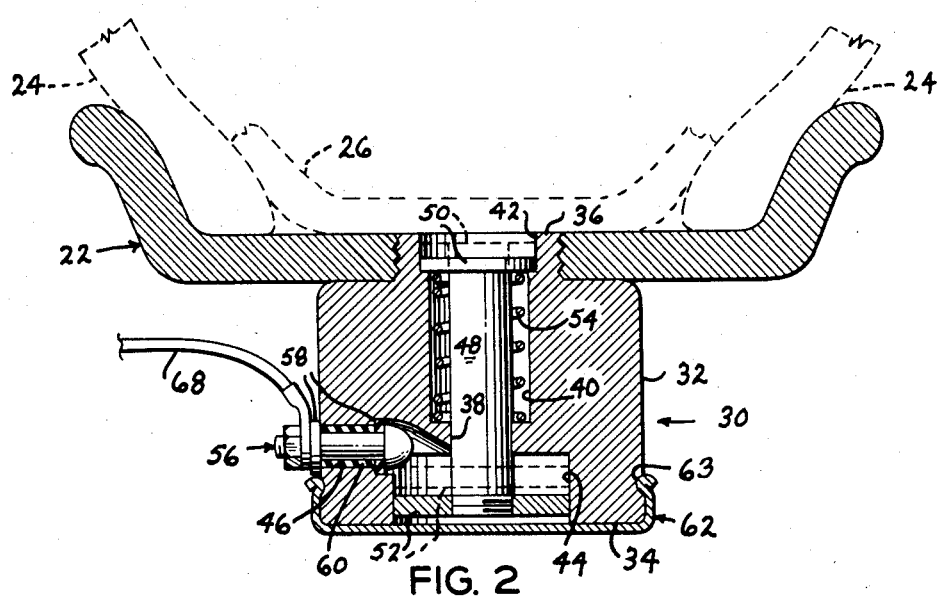
Figure 2 is a vertical cross sectional view of the instant invention installed on a tire rim with a fragment of the tire and tube being shown in dotted lines.

Referring now more particularly to Fig. 2, the reference numeral 30 indicates, as a whole, the switch of the present invention which is cylindrical in general configuration. The switch 30 includes a body 32 having an outer end 34 and an externally threaded shank end 36 of reduced size which is engaged within a threaded perforation placed at a selected point in the flat portion of the tire rim 22. The body 32 and shank 36 are axially through bored, as at 38. The bore is concentrically enlarged from the shank end 36 to provide a first recess or spring receiving socket 40. The shank end of the bore is further concentrically enlarged to provide a second annular recess 42 of a selected depth. The bore at the outer end 34 of the body is enlarged to provide an annular recess 44 of a selected depth. The body 32 is further provided with a lateral perforation 46 through its wall in communication with the inner end of the recess 44, for the purposes more fully explained hereinbelow.

A plunger or rod 48 is slidably disposed within the bore 38 and has an integral annular flange or circular head 50 which is slidably received by the recess 42 of the shank end. A disk 52 is axially threaded on the end of the rod opposite the flange 50 and is slidably received within the recess 44. Longitudinally the rod 48 is slightly less than the combined length of the body 32 and its shank 36 and is such that with the annular flange 50 seated on the inward end surface of the recess 42, the disk is disposed substantially adjacent the end 34 of the body. A helical expansion spring 54 is placed within the socket 40 around the rod 48 with one end of the spring seated against the annular shoulder formed by the inner end of the socket and its opposite end seated against the flange 50.

A screw 56 having a semi-spherical head is placed within the lateral bore 46 with the head projecting into the recess 44 and the other end of the screw extending beyond the wall of the body 32. The screw is electrically insulated from contact with the body 32 by washers 58 and a sleeve 60. A cap 62 seals the outer end 34 of the body and is held in place by an annular groove 63 in the surface of the body.

A substantially transversely flat surfaced electrical conductor ring 64 having an inner ring 66 of insulating material bonded thereto is pressed onto the hub or brake drum 18 of the vehicle and rotates therewith (Fig. 1). Electric wiring 68 connects the screw 56 with the conductor ring 64. A carbon brush 70 is rigidly carried by a pair of non-conductive arms 72 pivotally connected to a bracket 74 which is rigidly carried by the brake shield 20. The brush 70 is held in sliding contact with the surface of the revolving conductor ring 64 by a spring 76 in a conventional manner. Electric wiring 78 connects the brush 70 with the vehicle electrical system through a lamp 80.

Operation

Figure 4:
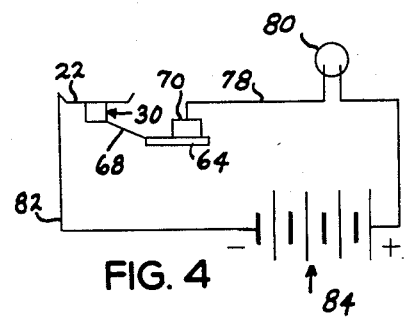
Figure 3:
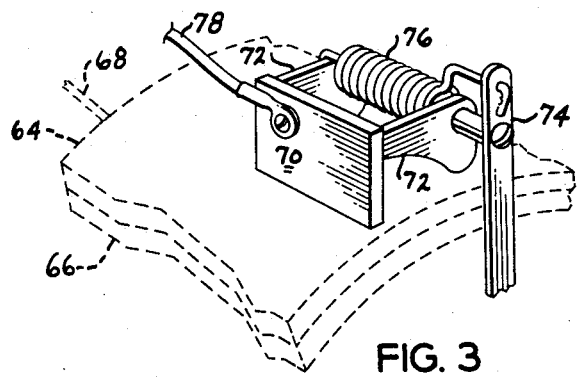
Figure 3 is a fragmentary perspective view of the electrical conductor brush of the invention in contact with the conductor ring as shown in dotted lines; and, Figure 4 is a schematic view of the electrical connections of the invention.

With the device installed, as disclosed hereinabove, the pressure within the tube 26 forces the same against the annular flange 50 which holds the disk 52 in spaced relation with the head of the screw 56. When the pressure is relieved within the tube 26 the helical spring 54 actuates the rod 48 to move the disk 52 into contact with the screw head, as shown by dotted lines in Fig. 2, which completes an electric circuit from the positive terminal of the battery through the lamp 80, the wiring 78, brush 70, conductor ring 64, wiring 68, disk 52, and which is grounded by the body 32 and the vehicle frame indicated by the line 82 (Fig. 4), back to the battery 84 to illuminate the signal lamp 80. Obviously the helical spring 54 may be made with various desired tensions to actuate the rod 48 at predetermined pressures.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A low pressure indicating switch for a pneumatic tire and tube mounted on the rim of a vehicle wheel including a substantially cylindrical body having an axial bore and an axial screw-threaded shank at its inner end for engagement with a complementary opening in the rim from the exterior of the rim, the bore being enlarged at its ends to provide concentric recesses and form an annular shoulder therebetween, a rod complementary to and slidable in said bore, an enlarged head on one end of the rod and complementary to and reciprocable within the recess at the shank end of the body for engagement with the tube through the opening of the rim, a helical spring confined on said rod between the head and the shoulder of said bore and in its shank end recess for urging said head into engagement with the tube, an electrical contact disk on the opposite end of said rod and complementary to and reciprocable in the recess at the outer end of said body, said body having a lateral opening communicating with said outer recess adjacent said shoulder, an electrical contact element extending through the opening for engagement by the disk when the force of the spring overcomes the pressure in the tube, and means in the opening insulating the contact element from said body, the length of said bore and its recesses being greater than the combined length of said rod, head and disk whereby said disk is held out of engagement with said contact element by the tube pressure.

2. A low pressure indicating switch as set forth in claim 1 wherein the bore is coextensive with the body, and a cap frictionally engaged on the outer end of said body for closing the outer end of the outer recess.

References Cited in the file of this patent

UNITED STATES PATENTS

| | | |
|---|---|---|
| 2,205,168 | Guthrie | June 18, 1940 |
| 2,239,676 | Henry | Apr. 29, 1941 |
| 2,246,389 | Skonnord | June 17, 1941 |
| 2,347,541 | Critser et al. | Apr. 25, 1944 |
| 2,502,515 | Flanery et al. | Apr. 4, 1950 |
| 2,520,241 | Geraci et al. | Aug. 29, 1950 |
| 2,523,594 | Sagaser et al. | Sept. 26, 1950 |
| 2,649,519 | Brown | Aug. 18, 1953 |
| 2,797,273 | Brodsky | June 25, 1957 |